Sept. 2, 1924. 1,507,258
A. E. SHIRLOW ET AL
WINDING OF CINEMATOGRAPH FILMS AND THE LIKE
Filed Aug. 19, 1922
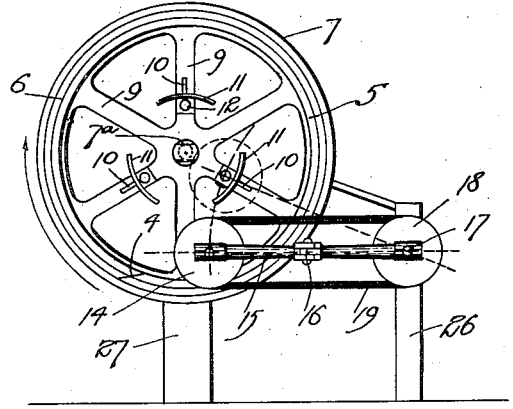
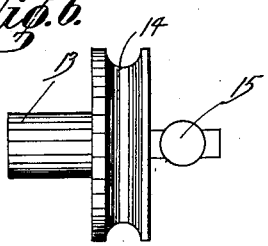
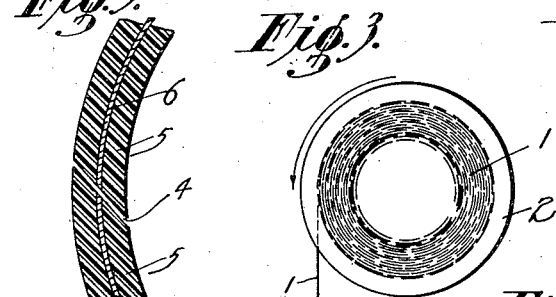
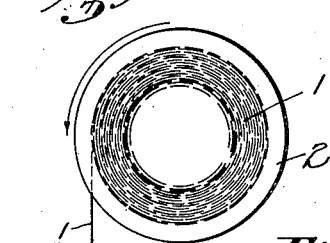
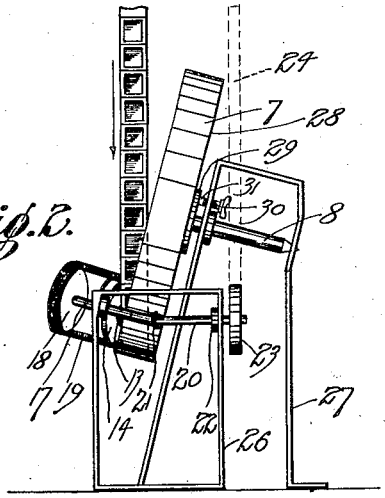
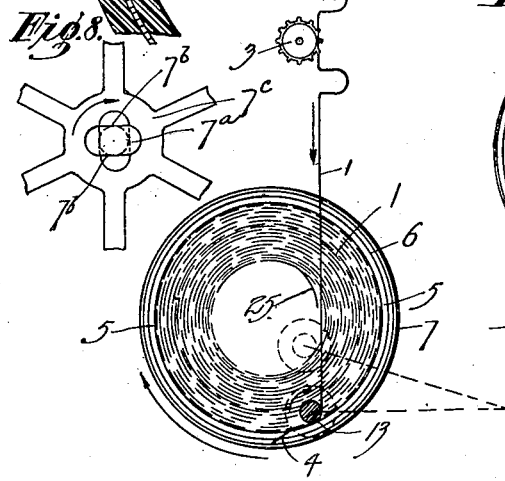
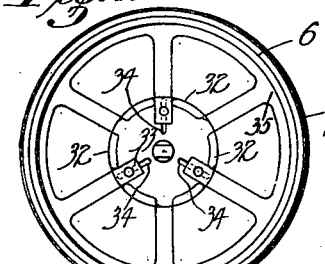
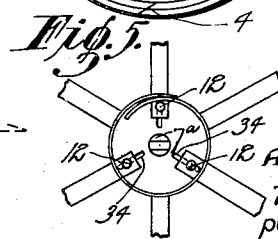
Inventors,
Albert Edward Shirlow
and
Thomas Bartlett McDiarmid
per
Attorney.

Patented Sept. 2, 1924.

1,507,258

UNITED STATES PATENT OFFICE.

ALBERT EDWARD SHIRLOW, OF GLENHUNTLY (NEAR MELBOURNE), AND THOMAS BARTLETT McDIARMID, OF MELBOURNE, AUSTRALIA.

WINDING OF CINEMATOGRAPH FILMS AND THE LIKE.

Application filed August 19, 1922. Serial No. 582,906.

*To all whom it may concern:*

Be it known that ALBERT EDWARD SHIRLOW and THOMAS BARTLETT McDIARMID, both citizens of the Commonwealth of Australia, and residents of Flower Street, Glenhuntly, near Melbourne, and 21–29 Burns Lane, Melbourne, respectively, both in the State of Victoria, Commonwealth of Australia, have invented certain new and useful Improvements in and Relating to the Winding of Cinematograph Films and the like, of which the following is a specification.

This invention relates to the winding of cinematograph films and the like, and has for its object the winding of such films in a rapid and expeditious manner without the difficulties and breakages resulting with the mechanism at present in use.

The method at present employed is crude and consists in passing the film from the spool, past the lens of the projector, and winding the same on a second spool, the outer end becoming the inner end, necessitating the rewinding before the film is ready for further use.

This method is defective for the above reason and also for the reason that great loss is involved in breakages and the handling in rewinding.

This invention has been devised in order to provide improved means whereby the rewinding operation is dispensed with, the film being wound on a spool after the projection in such a manner that it is immediately ready for further projection or use.

In accordance with this invention the film after passing through the projector is carried and is held to a second spool capable of rotation, the title end of the film being held and disposed on the outside of the second spool, the operation being such that the winding convolutions of the film, in rotation, take the next inside position, so that the end of the film is at the innermost coil of the winding, and the title is on the outside windings in advance of the theme thus the film is ready for immediate re-use, in the known manner.

An essential characteristic embodied in this invention consists, after the passage of the film through the gate of the cinema machine, in passing the title end of said film between angular abutting edges of a flexible and resilient or other band, which is accommodated against the inner circumferential surface of a revolvable drum, so mounted that the axis thereof is disposed at an angle to the axis of the feeding spool.

A further essential feature consists in placing a flexibly mounted and resiliently surfaced roller or rollers over the film, the roller or rollers by their engagement with the film surface, the primary and subsequent layers of which are disposed between the surface of the roller or rollers and the resilient or other band described, are caused to move in the opposite direction thereto and towards the centre of said drum.

A further essential feature consists in forming the film receiving spool with a detachable side to allow of the winding of the film thereon when the spool is positioned in the winding drum.

But in order to more readily understand the invention it will now be described with reference to the accompanying drawing in which:—

Figure 1 is a front elevation of apparatus construction according to this invention.

Figure 2 is a side elevation thereof.

Figure 3 is a diagrammatic view showing the path of the film after leaving the feeding spool to the rewinding on to the inner surface of the drum.

Figure 4 is a plan view of an alternative construction of the adjustable inner supporting members for the inner layers of film.

Figure 5 is a part plan view of a further alternative of Figure 4.

Figure 6 is a side elevation of the resiliently surfaced roller and one of the flexibly mounted pulleys.

Figure 7 is a side elevation of the rewound film held between the removable sides forming the spool.

Figure 8 is a detail view of the means for securing the detachable side of the spool to the other spool member after the film is rewound in the drum, and Figure 9 is an enlarged part view of the flexible band.

According to this invention the end of the film 1, on leaving the feeding spool 2, and passing through the gate and feed regulating sprocket 3 of the cinema machine, is held between the angular abutting edges 4 of a flexible and resilient band 5, preferably formed with a flexible metallic band 6, which is secured between the layers of resilient strips forming the band, The resilient and flexible band 5 is disposed against the inner circumferential surface of a movably mounted drum 7 arranged so that the axis 8 of said drum 7 is at an angle to the axis of the feeding spool 2.

The spool frame is provided with spokes or arms 9, some or all of which are provided with radial slots 10 to accommodate adjustable supports 11, held in position in the radial slots 10 by means of screws 12.

The object of having the supports 11 adjustable is for the reason that films vary in length and, said supports occupy their innermost position during the winding of the film and are not spread out to engage with the surface of said film until same has been completely wound.

The outer end of the film being held between the abutting angular edges of the flexible and resilient band 5, is then caused to follow the path of said band by means of a flexibly mounted and resiliently surfaced roller 13 which is preferably formed on a grooved wheel 14 which is revolvably mounted to a rod 15 having a universal joint 16 disposed preferably midway thereon.

The inner end of the rod 15 is supported on a spindle 17, which also supports a grooved pulley 18, and by means of a flexible or other belt 19, motion is transmitted to the pulley 14, from the pulley 18.

The spindle 17 on the inside connects a spindle 20 by means of a universal joint 21, so that the wheels 14—18 may operate at an angle to suit the angle of the drum 7.

Collars 22, are fixed to the spindles 17—20 in order to keep them in their respective places, and on the outer end of the spindle 20 is a pulley 23 to connect, by means of a belt 24 or other means, the driving pulley of the cinema machine, and thus impart the same feeding speed from the spool 2 to the receiving or rewinding drum described.

The object of having the pulleys 14—18 flexibly mounted is to allow them to move upwardly towards or in the direction of the centre of the drum 7, as shown in dotted lines Figure 1, and as each subsequent convolution of films comes into position, so the roller 13 rises and continues to do so until the inner layer or end 25 is reached.

The mechanism so far described with the exception to those parts having direct reference to the cinema machine such as for instance, the gate and feed sprocket 3 and spool 2 may be supported upon a framework 26—27, although it is desired to be understood that the mechanism may be suspended from the existing cinema framework or supports or from any convenient place wherein the apparatus may be conveniently operated.

The object of the rod 15 being provided with a universal joint 16 is for the purpose of allowing the roller 13 and wheel 14 to be swung clear so as to remove the rewound film together with its reel or spool clear of the drum 7.

On the inner face 28 of the drums 7 a shoulder 29 is formed and a thumb screw 30 or other adjustable means is adapted to engage the surface of said shoulder 29, in order to retard any excess movement of the drum which might be detrimental to the film, and preferably a cushion 31 is disposed between the end of the screw 30, and face of the shoulder 29, so as to ensure a reasonable retarding means upon the drum.

The adjustable screw 30 contacts sufficiently with the surface of the shoulder 29 to stop the drum 7 momentarily should any slack occur in the film 1, and the roller or rollers 13 functions so that the slackness will be absorbed in the already completed convolutions or in the subsequent one.

As an alternative as regards the adjustable supports 11, a series of steel spring bands 32 may be secured to foot pieces 33 movably disposed in radial slots 34 formed in the spool side 35, the spring bands 32 being arranged in such a manner that they overlap and form one continuous circular support, and as an alternative a single continuous spring band 32 may be formed with overlapping ends as shown in Figure 5, so that an even and continuous circular support is provided capable of adjustment to suit the diameter of the central space of the film.

Figure 7 shows the spool when withdrawn from the drum 7 in readiness for further projections or other purposes.

Figure 8 illustrates the end of the spindle 7ᵃ, so formed with flats 7ᵇ, that a side 7ᶜ, may be placed thereover and by turning the side 7ᶜ in the direction of the arrow or viceversa, the side 7ᶜ fits into the groove cut in the spindle 7ᵃ, thus allowing the rewound film and spool to be withdrawn from the drum 7.

What we claim as our invention and desire to secure by Letters Patent is:—

1. Means for winding cinematograph films and the like comprising a film-feeding spool, a rotating film receiving drum, and a band arranged within and against the inner circumferential surface of the drum and having angular abutting edges for receiving the title end of the film after same has passed through the gate of the projector.

2. Means for winding cinematograph films and the like, comprising a feeding spool, a winding spool disposed in a winding drum, a band inside the drum split to receive the title end of the film, a roller device for guiding the film coils as they wind, in rotation, towards the center of the drum, and means for driving the roller device at the same speed as the drive of the machine.

3. Means for winding cinematograph films and the like, comprising a feeding spool, a winding spool arranged within a winding drum mounted to rotate about an axis disposed at an angle to the axis of the feeding spool, a band inside the drum split to receive the title end of the film, a roller device for guiding the film coils as they wind, in rotation, towards the center of the drum, means for driving the roller device at the same speed as the drive of the machine, and means for retarding the movement of the drum for the purposes specified.

4. Means for winding cinematograph films and the like, comprising a rotary drum, a film receiving spool within the drum and a flexible and resilient band formed with angular abutting edges to receive the title end of the film.

5. Means for winding cinematograph films and the like, comprising a film receiving spool, a detachable side on the said spool, a rotatable inclined winding drum enclosing said spool, and driving means, comprising a flexibly mounted resilient roller, a grooved pulley connected to the roller, an arm provided with a universal joint and pivotally connecting at one end to said grooved pulley, a second grooved pulley mounted at the opposite end of said arm, a support disposed rearwardly of the winding drum, a spindle carried by said support substantially parallel with the axis of the winding drum and carrying the said second pulley and a flexible driving member between the first and second pulleys.

6. Means for winding cinematograph films and the like, comprising a feeding spool, a winding drum, the axis of which is disposed at an angle to the axis of the feeding spool, and driving means consisting of an inclined spindle, a rearwardly disposed groove pulley on the spindle, a spindle provided with means for imparting relative speed to the winding drum from the cinematograph machine, and a universal joint between the spindles.

7. Means for winding cinematograph films and the like, comprising a winding drum, a resilient roller capable of moving towards the centre of the winding drum, a pivoted and grooved pulley carrying said resilient roller, a rear grooved pulley, a flexible arm connecting said pulleys and having a universal joint formed thereon.

8. In apparatus for winding cinematograph films and the like, having a winding drum, means to permit removal of a completed spool from the winding drum, consisting of a resilient roller, a flexible arm carrying the roller, and a universal joint disposed therein, to permit of the resilient roller being moved clear of said winding drum.

Signed at Melbourne, Victoria, Australia, this 17th day of July, 1922.

ALBERT EDWARD SHIRLOW.
THOMAS BARTLETT McDIARMID.

In the presence of—
 SIDNEY HENDLEY,
 JEANNE BOUSHIERE.